United States Patent [19]

Torphammar et al.

[11] 4,008,864
[45] Feb. 22, 1977

[54] LOCKING MECHANISM FOR A SAFETY BELT

[76] Inventors: Nils Gustav Yngve Torphammar, Ostermalmsvagen 6, S-612 00 Finspang; Per Gustav Torphammar, Surbrunnsgatan 8, S-411 19 Goteborg, both of Sweden

[22] Filed: Feb. 18, 1975

[21] Appl. No.: 550,398

[30] Foreign Application Priority Data

Feb. 18, 1974 Sweden .............................. 7402102

[52] U.S. Cl. .......................................... 242/107.4 R
[51] Int. Cl.² .................... A62B 35/02; B65H 75/48
[58] Field of Search ............ 242/107.4 R, 107.4 E; 297/388; 280/744–747

[56] References Cited

UNITED STATES PATENTS

| 2,708,966 | 5/1955 | Davis | 242/107.4 A |
| 3,695,545 | 10/1972 | Peters | 242/107.4 A |

*Primary Examiner*—Stanley N. Gilreath
*Assistant Examiner*—John M. Jillions
*Attorney, Agent, or Firm*—Eric Y. Munson

[57] ABSTRACT

An improved locking mechanism for a safety belt of the type having a rotatable storage reel from which the belt may be automatically wound and a pivoting pawl for engaging the teeth of a ratchet wheel connected to the reel for locking it in position to prevent rotation includes the provision of an oval shaped bearing hole means located within the pawl for permitting sliding movement of the pawl on a pivot in addition to pivoting movement. A recess means formed on the pawl receives the arm of a lever for actuating the pawl and defines a cam-like surface on which the lever arm slides so that the lever returns to its position prior to actuation when the pawl slides on the pivot after locking engagement with the ratchet wheel. The oval shaped bearing hole may have a longitudinal axis substantially parallel to a plane tangent to the circumference of the ratchet wheel thus providing a high moment of force on the ratchet wheel along with a small bearing load on the wheel and pawl. The lever may be actuated by electrical coil means operated by an inertia responsive release system including a mercury switch.

5 Claims, 4 Drawing Figures

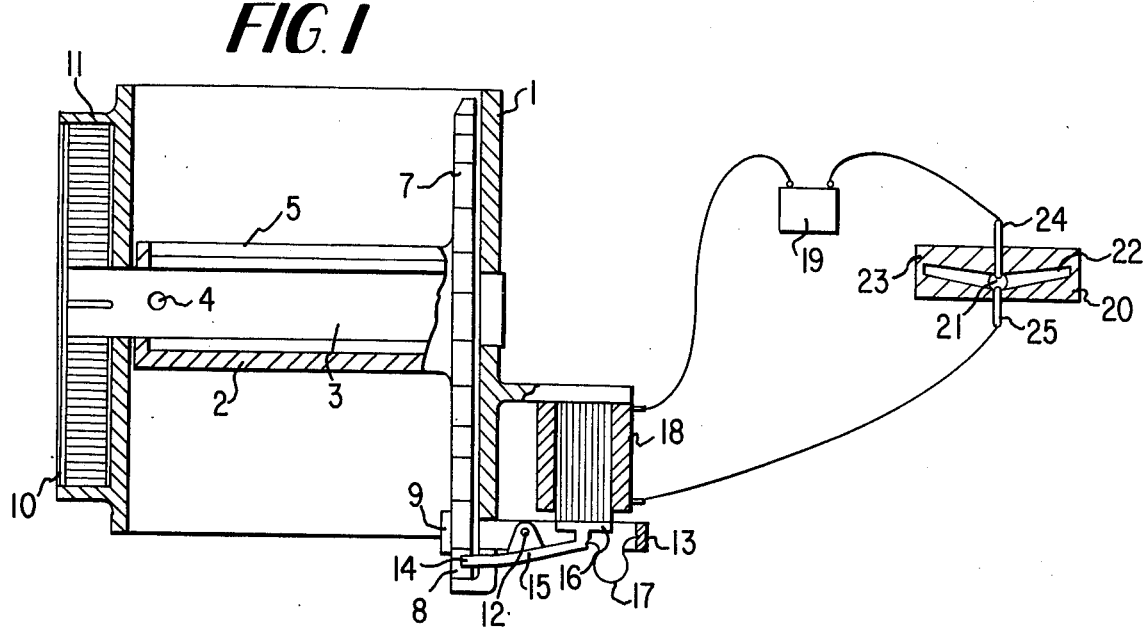
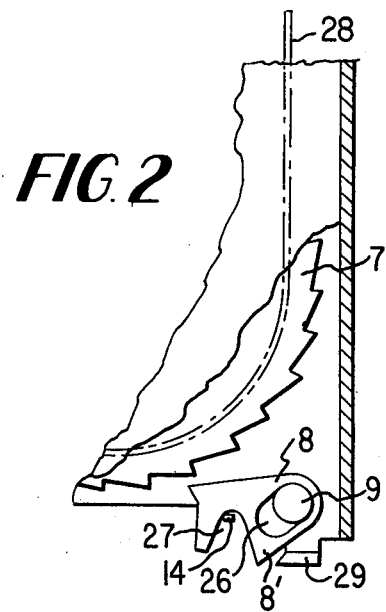
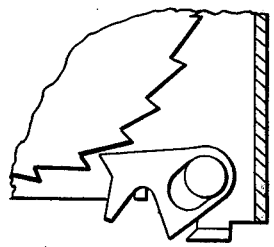
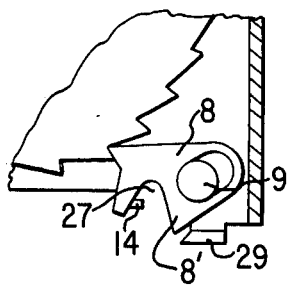

LOCKING MECHANISM FOR A SAFETY BELT

BACKGROUND OF THE INVENTION

The present invention relates to a locking mechanism preferably for a safety belt of the type which comprises a rotatable storage reel on which the belt can be automatically wound up. The locking mechanism has a ratchet wheel connected to the reel and a locking pawl which can be turned on a round pivot into engagement with said ratchet wheel for preventing rotation of the storage reel when actuated by a lever operable from a release arrangement comprising inertia means.

In known locking mechanisms of the above-mentioned type it may occur that the pawl, when being turned into engagement with the ratchet wheel and especially when meeting the point of a tooth on the ratchet wheel, is rebounded towards its released or unlocked position. This could have the disastrous consequence that a large portion of or even the whole belt is wound off the storage reel before the pawl again is brought into engagement with the ratchet wheel.

SUMMARY OF THE INVENTION

According to the present invention there is provided a locking mechanism in which the above described risk is completely eliminated.

This is accomplished according to the invention by providing a pawl having an oval hole for bearing on the pivot and having a recess having a sliding surface on which the actuating lever, after activating the pawl, slides back towards its original position. This occurs when the pawl with its oval hole slides on the pivot when engaging the ratchet wheel. As a consequence, the pawl will be forced rapidly to firm engagement with the ratchet wheel, as will be explained in greater detail below, where further advantages will also be set forth.

In a preferred embodiment, the oval bearing hole in the pawl extends in a direction substantially parallel to a plane tangent to the ratchet wheel circumference. As a result the greatest possible moment force of the pawl on the ratchet wheel as well as the smallest possible bearing load on the ratchet wheel and the pawl are achieved. Furthermore, a rapid disengagement of the pawl from the ratchet wheel is guaranteed.

The release arrangement can be a two-armed lever actuated by an electro-magnetic coil which is contained in an electric circuit comprising a retardation and inclination sensing electric switch, for example, a mercury switch. This switch is preferably arranged to break the electric circuit when the retardation or inclination reaches a certain amount, whereby, the coil releases the lever which, under the influence of a spring force, brings the pawl into engagement with the ratchet wheel. The lever is momentarily thereafter automatically moved back towards the coil by sliding on the sliding surface in the recess on the pawl. As a consequence of this mechanical restoring of the lever occurring at the same time as the locking mechanism is brought to its locking mode, the necessary operating power for the electro-magnetic coil is reduced to a minimum. Thus, only a small amount of so called electromotive work is required to bring about coil release of the lever very quickly, which in turn means that the mechanism is locked very quickly. The small electromotive work furthermore means that only one retardation and inclination sensor is necessary for all safety belts in a vehicle.

BRIEF DESCRIPTION OF THE DRAWINGS

A preferred embodiment of the invention will now be described with reference to the drawing, wherein FIG. 1 shows a sectional view of a safety belt comprising a locking mechanism according to this invention;

FIG. 2 in more detail shows the locking mechanism of FIG. 1 in its unlocked mode;

FIG. 3 shows the same locking mechanism in a position between unlocked mode and locked mode;

FIG. 4 shows the locking mechanism in its locked mode.

DESCRIPTION OF THE PREFERRED EMBODIMENTS

Referring to FIGS. 1 and 2, 1 designates a housing, in which a hollow storage reel 2 is rotatably journalled. In the reel 2 a shaft 3 is axially inserted, which can be locked to the reel 2 by means of a radial pin 4, which in turn is inserted through the reel 2 and the shaft 3. The reel 2 is provided with an axial slot 5. A belt 28 is wound on the reel 2. One end of the reel 2 carries a ratchet wheel 7 provided with teeth for engagement with a locking pawl 8 rotatably journalled on a round pivot 9 connected to the housing 1.

At the other end of the reel 2 a coil spring 10 is arranged. One end of this spring is attached to the reel 2, whereas its other end is fixed to a spring casing 11 on the housing 1. The spring 10 is stretched to exert a winding take up force on the belt 28.

In this embodiment a double-armed lever is pivoted on a pivot 12 supported by a clamp 13 attached to the housing 1. The one arm 14 of the lever, called the actuation arm in the following, is arranged to actuate the pawl 8. Its other arm, called the armature arm 15 in the following, has an armature 16. Between the armature arm 15 and the clamp 13 a spring 17 is stretched.

The pawl 8 is arranged to be actuated over the lever from a release arrangement in the form of an electromagnetic coil 18 attached to the housing, which coil is connected to a battery 19 over a mercury switch 20 consisting of a mercury drop 21 put in a dish-shaped cavity 22 in a casing 23. In the normal case the drop is in the position shown in FIG. 1 between two contact rods 24, 25, which means that the electric circuit comprising the coil 18 is closed so that the armature 16 is attracted to the coil to the position shown in FIG. 1 and the spring 17 is stretched. When the mercury drop 21 is thrown from the position between the rods 24, 25 when rapid changes in inclination or velocity of the vehicle occur, the current supply to the coil 18 ceases, which then releases the armature 16, whereby the lever under the influence of the spring 17 actuates the pawl 8 into engagement with the ratchet wheel 7 for locking the mechanism. According to the invention the pawl has an oval bearing hole 26 for bearing it on the round pivot 9. Through this, when the pawl 8 engages the ratchet wheel 7 the pawl slides in its oval bearing hole 26 on the round pivot 9 as well as pivoting thereon. According to the invention, the pawl 8 is furthermore designed with a recess 27 with a cam-like surface on which the actuation arm 14 slides back towards its position it occupied in its unreleased mode when the pawl slides in its oval bearing hole 26 on the pivot 9. This action causes the force of the spring 17 in the arm 14 to increase again. In this way, the pawl 8 will inexorably be forced rapidly into a firm three point hold between the ratchet wheel 7, the pivot 9 and the spring biased actuation arm 14. At the same time as the actuation arm 14 is moved downwards by the sliding surface in the recess 27 the armature 15 arm is moved upwards so that the armature 16 is moved back to the coil 18. Thus a restoring of the lever by means of the coil 18 itself is not necessary, which means that the required operating power of the coil is reduced to a very small amount with the accompanying advantages mentioned earlier in this description.

The longitudinal axis of the oval hole 26 in the pawl 8 extends preferably as shown in the drawing in a direction substantially parallel to a plane tangent to the circumference of the ratchet wheel 7. As mentioned above, this results in the greatest possible moment force of the pawl 8 on the ratchet wheel 7 as well as the smallest possible bearing load on the ratchet wheel and the pawl. This also enables the pawl to rapidly disengage from the ratchet wheel, when the mechanism is switched over from its locked into its unlocked mode. What happens then is that the ratchet wheel 7 releases its hold of the pawl 8, which falls downwards by its own weight, thereby sliding on the pivot 9 and the actuation arm 14.

If a vehicle in an accident happens to land upside down or on one side, the pawl 8 falls by its own weight, independent of any other actuation, into engagement with the ratchet wheel for locking the mechanism. By including a cut-off relay in the circuit comprising the coil, the operating terminal of which is connected to the ignition lock of the vehicle, the driver can lock all safety belts in the vehicle by means of the ignition key.

A portion 8' on the pawl 8 coacting with an additional sliding surface 29 contributes to forcing the pawl into engagement with the ratchet wheel, in the event that the pawl meets a tooth point of the ratchet wheel.

The present invention is not restricted to the embodiment described above and shown in the drawing, but several modifications can be made within the scope of the following claim.

For example, the release arrangement does not need to be an electro-magnetic coil connected to a retardation and inclination sensing switch but other means can also be used for operating the lever, such as inertia responsive pendulum devices of various kinds.

The lever for actuating the pawl has been described and is shown in the drawing as a two-armed lever, but one could as well use a one-armed lever for this purpose, for example pivoted on the same pivot as the pawl. Thus, in this case there is no separate armature arm but the release arrangement and the release spring act directly on the actuation arm.

We claim:

1. In a safety belt of the type including a rotatable storage reel on which the belt may be automatically wound, a ratchet wheel connected to the reel, pivot means, a locking mechanism including pawl means mounted on said pivot means for engaging the ratchet wheel to prevent rotation of the storage reel, a lever having an arm contacting the pawl for actuating it and inertia responsive release means for operatively releasing the lever, the improvement in locking mechanism means comprising:

an oval shaped bearing hole located within the pawl means for permitting sliding movement of the pawl on the pivot means in addition to pivoting movement when the pawl engages the ratchet wheel for locking, a recess means formed on the pawl means for receiving the arm of the lever, the recess means defining a cam-like surface on which the lever arm slides, the cam-like surface of the recess means being shaped so as to cause the lever arm sliding thereon to move to the position it occupied prior to its release by the inertia responsive release means when the pawl undergoes sliding movement on the pivot means, and means for biasing the lever arm to move the pawl into engagement with the ratchet wheel when the inertia responsive release means releases the lever.

2. The improved locking mechanism as claimed in claim 1 wherein the longitudinal axis of the oval bearing hole in the pawl means extends in a direction substantially parallel to a plane tangent to the circumference of the ratchet wheel.

3. The improved locking mechanism as claimed in claim 1, which includes an electric circuit comprising a retardation and inclination sensing switch and wherein the release means comprises an electromagnetic coil operatively joined to the lever and connected in said electric circuit.

4. The improved locking mechanism as claimed in claim 3, wherein the sensing electric switch is one arranged to break the electric circuit when the retardation or inclination reaches a predetermined amount thereby causing the coil to release the lever and actuate the locking pawl and a spring means is operatively connected with the locking pawl to effectuate its engaging movement.

5. An improved locking mechanism as claimed in claim 4 wherein the electric switch is a mercury switch.

* * * * *